Figure 1:
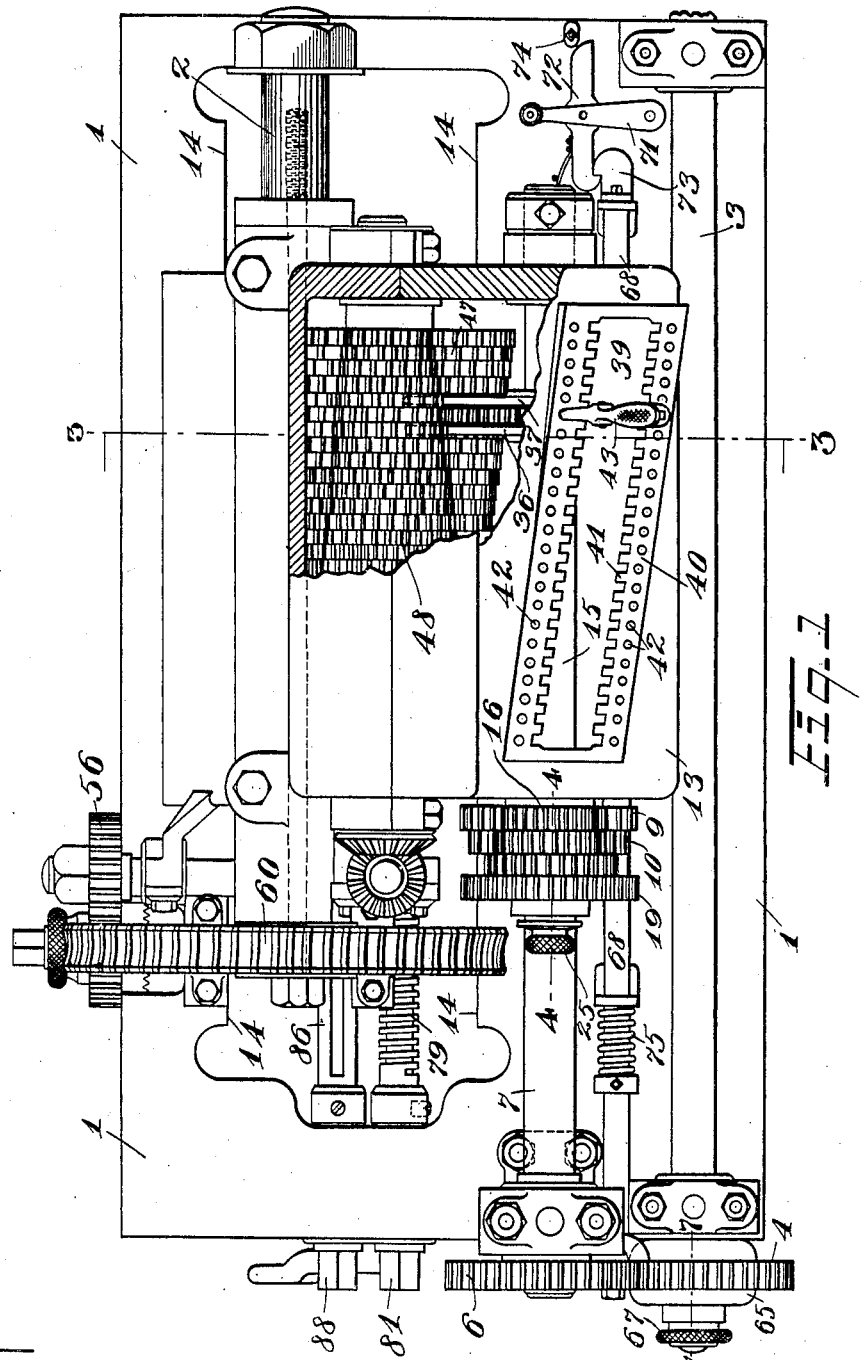

E. H. BROWNING.
GEARING FOR INDEXING MECHANISMS.
APPLICATION FILED DEC. 14, 1907.

930,934.

Patented Aug. 10, 1909.
3 SHEETS—SHEET 1.

Witnesses:
Brennan B. West.
Nathan F. Fretter.

Inventor,
Earl H. Browning.
By Bates, Fouts & Hull,
Attys.

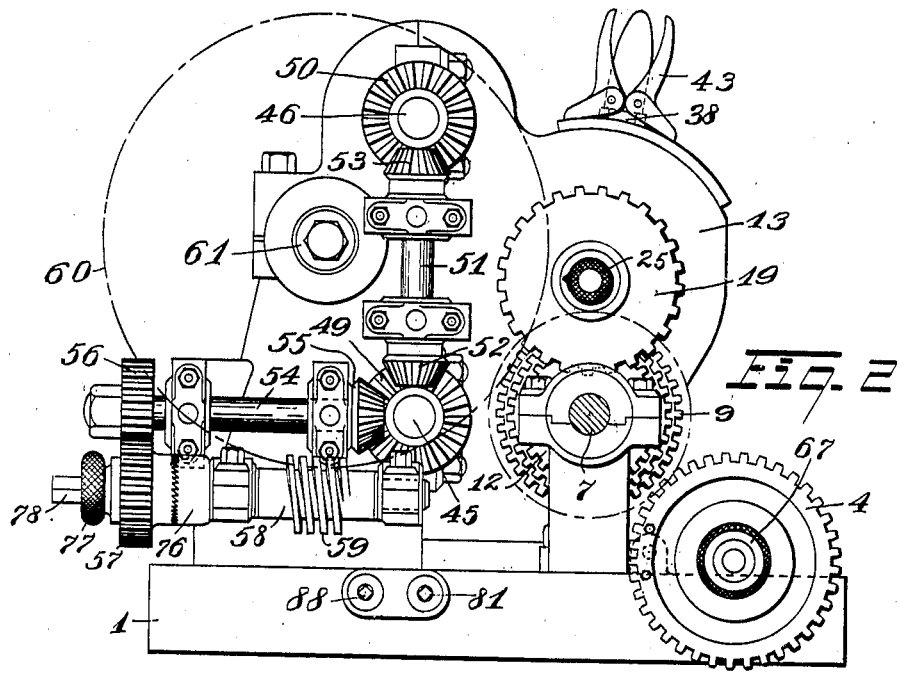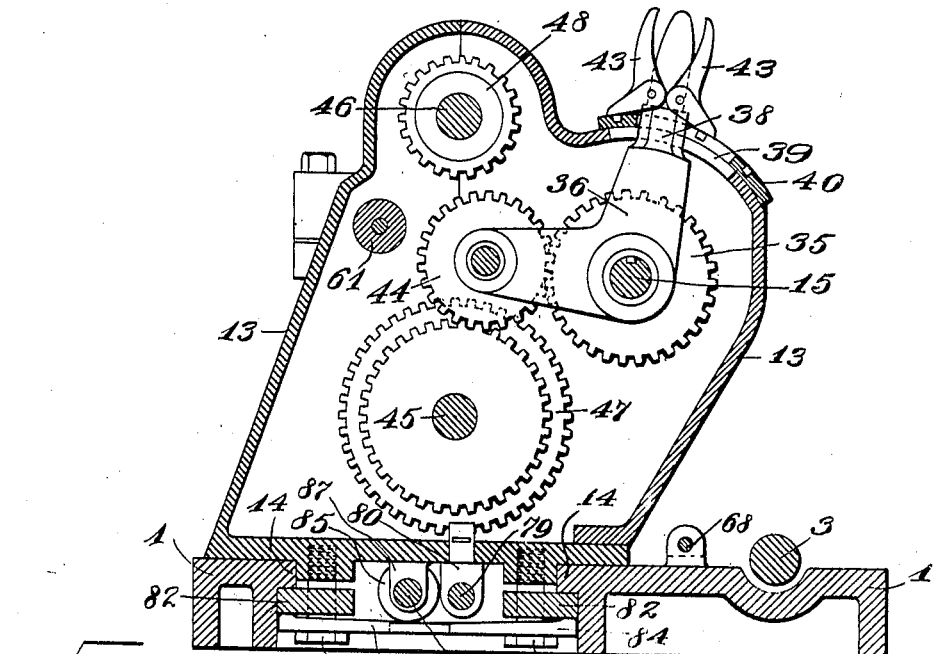

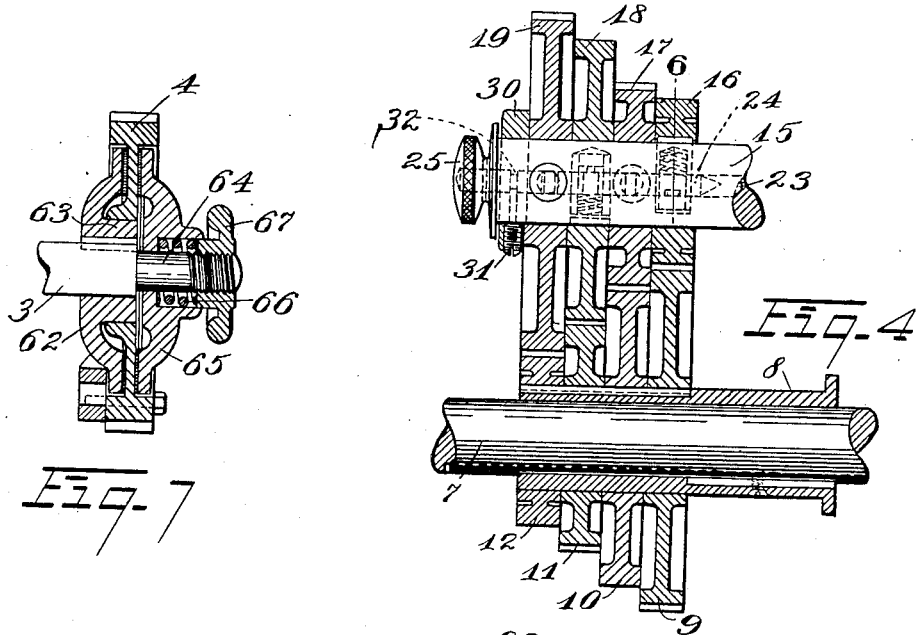
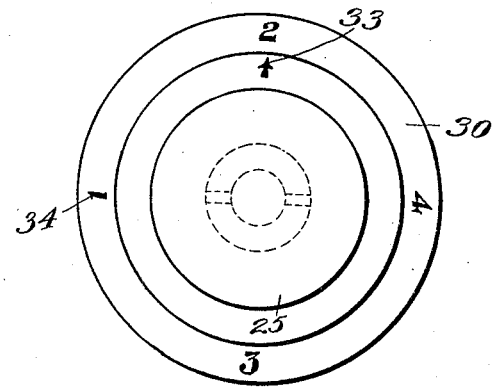
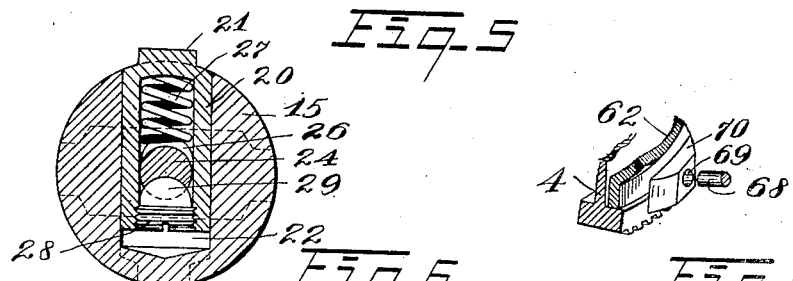
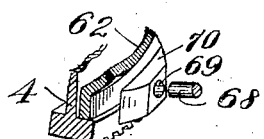

UNITED STATES PATENT OFFICE.

EARL H. BROWNING, OF NOTTINGHAM, OHIO.

GEARING FOR INDEXING MECHANISMS.

No. 930,934. Specification of Letters Patent. Patented Aug. 10, 1909.

Original application filed May 7, 1907, Serial No. 372,375. Divided and this application filed December 14, 1907.
Serial No. 406,432.

*To all whom it may concern:*

Be it known that I, EARL H. BROWNING, residing at Nottingham, in the county of Cuyahoga and State of Ohio, have invented a certain new and useful Improvement in Gearing for Indexing Mechanisms, of which the following is a full, clear, and exact description, reference being had to the accompanying drawings.

This invention relates to gearing for use in indexing mechanisms for gear-cutting machines, and is a division of my pending application Serial No. 372,375, filed May 7, 1907.

The invention has for its objects the provision of means for indexing or turning the gear blank so as to present a new surface to the action of the cutting tools in order to cut a new tooth on the blank; the provision of means for turning the gear blank a greater or less distance according to the number of teeth to be cut on the blank, and the provision of means for retaining the mechanism in any of its numerous adjustments. These and other improvements are so combined and constructed as to produce an indexing mechanism for the purpose specified that will be of great simplicity of construction and operation and that will possess sufficient strength for the purpose for which it is intended.

In the drawings forming a part of this application, Figure 1 is a plan view of the table and the indexing mechanism connected therewith, a portion of the casing being broken away in order that the gearing beneath the same may appear; Fig. 2 is an end elevation of the mechanism shown in Fig. 1, certain of the gears being removed; Fig. 3 is a transverse section taken substantially on the line 3—3 of Fig. 1 and looking toward the right; Fig. 4 is a vertical section through the change gears taken on the line 4—4 of Fig. 1; Fig. 5 is an elevation of the index plate connected with the change of speed gears shown in Fig. 4; Fig. 6 is a sectional view taken on the line 6—6 of Fig. 4 showing the clutch mechanism; Fig. 7 is a sectional view through the frictional mechanism, said view being taken on the line 7—7 of Fig. 1; and Fig. 8 is a perspective view, partly in section, of a portion of said friction mechanism and of the detent for controlling the latter.

Taking up a detailed description of my invention by reference to the accompanying drawings, in which similar reference characters designate corresponding parts throughout the several views, 1 represents a frame upon which I mount the indexing mechanism for controlling the operations of the mandrel or arbor 2, upon which the gear blank to be cut is mounted in the usual manner. As shown in my former application, of which this is a division, the table is mounted to swing, in order to carry the gear blank toward and from the cutting tools. The invention shown in this application is applicable to any form of gear cutting machine; and I have accordingly omitted the mechanism for moving the table, it being understood that, in the cutting of gear teeth, the gear blank may be moved toward the cutting tool, or the latter may be moved toward the gear blank. Suitable mechanism will therefore be provided in the complete machine for producing this relative movement of the gear blank and the cutting tool.

Journaled upon the frame 1 is a shaft 3 to which the power for operating the index mechanism is applied. Concentrically mounted on this shaft, and yieldingly held thereto by means hereinafter described, is a gear wheel 4, meshing with a gear wheel 6 on a shaft 7 that extends inwardly to about the center of the frame and parallel with the shaft 3. Near its inner end a sleeve 8, (see Fig. 4) is splined to the shaft 7 so as to turn therewith and be capable of longitudinal movement thereon. Keyed or otherwise secured to the sleeve 8 is a series of gear wheels, said wheels being shown at 9, 10, 11, and 12, the wheels varying successively in diameters. The sleeve 8 at the right of the gear wheel 9 is journaled in the end of a housing 13, which housing is movable upon ways or tracks 14 on the frame 1, for a purpose hereinafter set forth.

Journaled in the housing 13 above the shaft 7 is a shaft 15, said shaft carrying at its left hand end outside of the housing a series of gear wheels, represented at 16, 17, 18 and 19, said gear wheels meshing respectively with the gear wheels 9 to 12 on the shaft 7. All of the gear wheels 9 to 12 turn positively and simultaneously with the shaft 7; but the gear wheels 16 to 19 inclusive are mounted loosely on the shaft 15, clutch mechanism being provided for connecting at will any one of said wheels to its shaft, the other wheels of the series being at that time free to turn loosely upon said shaft. The clutch mechanism just referred to is duplicated for each of the gear wheels, so that a description of a single clutch will suffice for all. This clutch, which is shown in Figs. 4 and 6 of the drawings, consists of a hollow plunger 20, having an end 21 that is adapted to project beyond the circumference of the shaft so as to engage with a recess or recesses in the interior of the hub of the gear for said clutch. The shaft 15 is bored out at 22 so as to receive the hollow plunger 20, and it is also bored longitudinally at 23 to receive a rod 24, said rod being provided on its outer end with a knurled head 25 by means of which it may be rotated in the shaft 15. The hollow plunger 20 is also provided with openings 26 through which the said rod extends, and between the rod and the outer end of the plunger I place a coiled spring 27 which maintains the plunger under spring pressure tending to force the same outwardly. Within the inner end of the plunger, I screw or otherwise secure a nut 28 having a rounded or hemispherical head 29 which is adapted to enter a correspondingly shaped recess in the rod 24, when said rod is turned to bring its recess into coincidence with said head.

In Fig. 4 I have shown four of the gear wheels 16 to 19 inclusive, although any greater or less number may be employed, if preferred, and there is a clutch mechanism for each of said gears. In order that only one of said gears may be clutched to the shaft 15 at any one time, the plungers 20 extend in different directions, the drawing showing the plungers arranged at angles of ninety degrees about the shaft. With such an arrangement, if the recesses in the shaft are properly positioned, preferably in a staggered fashion, two or more of the plungers can never be in engagement with their gear wheels at the same instant. The gear wheels are held on the shaft 15 by a collar 30 having a set screw 31 which engages a groove 32 in the rod. In order to operate any clutch desired, the knurled head 25 is turned, and its position is determined by an index mark 33 which is adapted to be brought into alinement with index numbers 34 on the collar 30, the numbers 34 being so positioned that when the mark 33 is turned toward one of the same, one of the gear wheels will be clutched to its shaft while the other wheels are unclutched therefrom.

Splined on the shaft 15 is a gear wheel 35 (Fig. 3) said wheel being mounted between the parallel arms 36 and 37 of a swinging lever 38. The outer end of this lever projects through a slotted opening 39 in the housing 13, this slot being wide enough to permit a rotative movement of the lever about the shaft 15. Mounted on the outer side of the housing is a plate 40 also having a slot, the side edges of which are provided with inwardly projecting spaced teeth 41, between which the lever 38 is adapted to be brought, the teeth preventing movement of the lever along its shaft. The plate 40 is also provided with holes or sockets 42, one for each of the teeth 41, and into said holes there is adapted to extend projections on the ends of grip levers 43 that are pivoted to the outer end of the lever 38. When the lever 38 is swung toward one side of the slot 39 and extends between any two of the teeth on the plate 40, the projection on the corresponding grip lever will snap into a socket 42 and hold the lever securely in the position to which it is moved. The lever 38 is in the form of the letter L, and it has journaled in its inner free end a pinion 44, which pinion is raised or lowered by moving the lever 38 to one side or the other of the slot in the plate 40.

Journaled in the housing 13, one above the other, are shafts 45 and 46, each of said shafts having secured thereto a long cone spur gear, as seen at 47 and 48. Each of these gears may be integral from end to end; but in practice they would preferably be formed of a series of gears brought side by side and secured to their respective shafts. The gears are so arranged on these shafts that the largest gear on one end of one shaft will be opposite the smallest gear on the corresponding end of the other shaft, so that the space between the cone gears remains practically constant throughout their lengths. The gear 44 is adapted to be moved by the lever 38 into mesh with any part of either of the gears 47 or 48.

The shafts 45 and 46 carry on one end, outside the housing, bevel pinions 49 and 50 respectively, said pinions being secured to their respective shafts. These pinions are connected through a shaft 51, which is journaled to the housing and which carries on its opposite ends bevel pinions 52 and 53, which mesh respectively with the gears 49 and 50.

Extending substantially at right angles to the shafts 51 and 45, and journaled in suitable bearings on the housing, is a shaft 54, said shaft having secured to its inner end a bevel pinion 55 which meshes with and is driven by the pinion 49. On its outer end the shaft 54 carries a spur gear 56, which meshes with a similar gear 57 on a worm shaft 58, said shaft being provided with a worm 59 which engages with and turns the worm wheel 60 on the arbor shaft 61.

From the description thus given it will be understood that the motion of the shaft 3 is transmitted through the train of gearing to the pinion 44, the latter being driven at a speed which is dependent upon the particular clutch that is in engagement on the shaft 15. The motion of the pinion 44 is transmitted to the worm shaft 58 through the cone gears 47 or 48, the pinions 49 or 50 and through the shaft 54, the reduction of the speed between the said pinion 44 and the worm shaft being dependent upon the particular part of the cone gears with which the pinion 44 is in engagement. By throwing, therefore, different clutch mechanisms into operation and by shifting the lever 38 along the shaft 15, and throwing the pinion 44 from one cone gear to the other, the distance which the worm shaft 58 and the gear blank will be turned for each rotation of the power shaft 3 will be varied as may be desired. By simply multiplying the steps on the cone gears and the clutch mechanism in the shaft 15, any variation desired can be secured.

The mechanism thus described is used in conjunction with the friction mechanism and the detent that coöperate with the gear 4 for the purpose of rotating the gear blank such distance as may be desired for cutting the prescribed number of teeth on the blank. The detent mechanism for the gear 4 is so arranged as to permit the gear to make one complete rotation between successive operations of the detent. This friction mechanism and the detent is shown in detail in Figs. 7 and 8 and, by reference thereto, it will be seen that the shaft 3 has keyed thereto a disk 62 having an inwardly extending hub 63 upon which the pinion 4 is journaled. Outside of the hub 63 the disk 62 is provided on its side face next the gear with a friction surface with which the pinion is adapted to engage. Beyond the disk 62 the shaft 3 is turned down to a smaller diameter, and on this smaller portion 64 I mount loosely a friction disk 65 having a friction surface opposite that on the disk 62. The friction surfaces of these two disks are adapted to be pressed against the web of the gear 4 and thus clamp the gear so firmly that the gear is compelled to turn with the disk 62. For regulating the degree of pressure between the disks, I employ a coil spring 66 which is mounted in the hub of the disk 65 and surrounds the shaft, said spring being placed under compression by a knurled nut 67 that screws on the end of the part 64 of the shaft 3. By simply turning this nut the tension of the spring may be varied and the friction between the disks and the gear 4 may be controlled. It will thus be seen that whenever the gear 4 is permitted to turn it will be rotated with the shaft 3, and motion will be transmitted from the latter to the gear blank on the arbor 2. It will be understood, however, that the gear blank must be held stationary while a tooth is being cut, and that the rotation of the blank must take place between the operations on the successive teeth. For that reason I employ a detent for holding the pinion 4 during the gear cutting operation, and for permitting the gear to turn once and once only after each tooth has been cut. This detent consists of a rod 68, the end of which is adapted to enter a socket 69 in a lug or projection 70 on the gear wheel 4. The rod 68 may be operated in any convenient manner, and may be automatic in its operation, as is shown in my parent application hereinbefore referred to. There is no necessity, however, of having the same automatic in its operation, and I have therefore shown the same in this application as manually operated, the means for operating the rod consisting of a pivoted lever 71 which carries a hooked pawl 72 that is adapted to engage over the hooked end 73 of said rod. By swinging the lever 71 to the right in Fig. 1, the rod 68 will be drawn out of the socket 69, which will permit the gear wheel 4 to turn with the shaft 3. This wheel must be again locked at the end of its first rotation and, for this reason, the pawl 72 is extended so as to engage with a stop 74, the stop and the pawl being so shaped that the latter will be lifted out of engagement with the hooked end 73 on the rod, thereby freeing the latter and permitting a coil spring 75 to again thrust the rod toward the wheel 4. By beveling the opposite ends of the lug 70, the rod 68 is cammed back, and, as soon as the socket 69 registers with the rod, the latter is thrust into the socket by the spring 75, thereby again locking the gear wheel 4.

It may be necessary in beginning work upon a gear blank to adjust the same with respect to the cutting tool, which operation should be independent of the movement of the gear wheel 4. For this purpose I connect the pinion 57 with the worm shaft 58 through a clutch mechanism 76, one member of the clutch being secured to the shaft and the other being secured to the pinion 57. The clutch members are held in engagement by a knurled nut 77 on the worm shaft; but, by loosening said nut, the clutch may be disengaged, after which the worm shaft may be turned by a crank which may be placed upon the squared end 78 of said shaft. The gear blank may thus be turned to any desired position, and, when properly adjusted, the clutch may be engaged by simply setting up on the nut 77.

As has been stated, the housing 13 is movable along the plate 1 on the ways or guides 14. This is for the purpose of initially adjusting the gear blank to the cutting tools. The housing is moved by means of a screw rod 79 which is journaled at its ends in the plate 1 and has threaded engagement with an internally threaded member 80 that is secured to the housing. The outer end of the rod is squared at 81 for the reception of a crank or wrench by means of which the rod may be turned. After the blank is properly positioned the housing is clamped to the plate 1 by friction members 82 which are loosely carried on bolts 83 that are tapped into the housing. Levers 84 are also carried on said bolts, said levers being adapted to be rocked so as to press the members 82 against the ways 14. These levers are rocked by eccentrics 85, but one being shown, that are splined to a shaft 86. This shaft, which is journaled in the plate 1 and in lugs 87 that project from the housing, has its outer end squared at 88 for the reception of a crank or wrench. By turning the shaft, the eccentrics 85 are caused to rock the levers 84 and thus clamp the housing to the plate 1. As shown in Fig. 3, these parts are unclamped, and the housing is free for adjustment.

While I have shown and described my preferred construction, I realize that changes may be made in many of the details, and I desire it to be understood that the following claims are not intended to be limited to the details shown any further than is made necessary by their express terms.

Having thus described my invention, I claim:

1. In gearing for indexing mechanisms, a base plate, a driven shaft carried by said plate, a gear, friction devices engaging the said gear for driving the latter, means for driving the friction devices, means for normally holding the gear against rotation, means for releasing said gear so that it may be turned, and mechanism connecting said gear with the driven shaft whereby, when the gear is rotated, the driven shaft will be turned, said mechanism including a countershaft, a plurality of gears of different diameters on said countershaft, a second countershaft, a plurality of gears of different diameters loosely mounted on said second countershaft and meshing respectively with the gears on the first countershaft, devices carried by the said second countershaft for connecting therewith any one of the gears that is carried thereby, and a rod mounted axially in said second countershaft, said rod having provisions coöperating with said devices for determining which of the said gears on the second countershaft will be connected therewith as the rod is turned, whereby the extent of movement of the driven shaft may be regulated.

2. In gearing for indexing mechanisms, a shaft, means for imparting intermittent rotations to said shaft, a plurality of gear wheels of different diameters secured to said shaft, a second shaft parallel with the first shaft, a plurality of gears wheels of different diameters mounted upon said second shaft and meshing respectively with the gear wheels on the first shaft, a plurality of plungers within said second shaft, there being one plunger for each of the gears on said shaft, springs connected with said plungers and tending to force the same outwardly into engagement with the hubs of their respective gear wheels, a rod extending into said shaft and coöperating with the said plungers, said rod being provided with sockets arranged in staggered fashion therein, and means whereby said rod may be turned, the construction being such that when the rod is turned so as to bring a socket therein into operative relation with its corresponding plunger, said plunger will be pressed by its spring into engagement with its gear wheel and lock the same to the shaft, while the other plungers, being out of operative relation with their respective sockets, will be held by the said rod out of engagement with their gear wheels.

3. In gearing for indexing mechanisms, a driven shaft for carrying the gear blank to be cut, a shaft, means for imparting intermittent rotations to said last mentioned shaft, a plurality of gear wheels of different diameters secured to said shaft, a second shaft parallel with the first shaft, a plurality of gears wheels of different diameters mounted upon said second shaft, a plurality of plungers within the second shaft there being one plunger for each of the gears on said shaft, springs connected with said plungers and tending to force the same outwardly into engagement with the hubs of their respective gear wheels, a rod extending into said shaft and coöperating with the said plungers, said rod being provided with sockets arranged in staggered fashion thereon, and means whereby said rod may be turned, the construction being such that when the rod is turned so as to bring a socket therein into operative relation with its corresponding plunger, said plunger will be pressed by its spring into engagement with its gear wheels and lock the same to the shaft, while the other plungers, being out of operative relation with their respective sockets, will be held by the said rod out of engagement with their gear wheels and gearing connecting the said second shaft with the said driven shaft.

4. In gearing for indexing mechanisms, a drive shaft, means for imparting intermittent rotations to said shaft, a driven shaft for supporting the gear to be cut, a cone gear connected with said driven shaft, a second cone gear having its axis parallel with the said driven shaft and being separated from the first cone gear, a shaft having geared connection with the said cone gears whereby they will be driven together, a gear secured to the drive shaft, so as to turn therewith but be capable of longitudinal adjustment thereon, a lever pivoted on the drive shaft and connected with the latter gear, so that as the lever is shifted the gear will also be shifted upon the drive shaft, an idler pinion carried by the said lever between the said cone gears so that it may be thrown into driving relation with any part of either of said cone gears, and means for securing said lever in any position to which it may be moved, whereby the intermittent rotation that is imparted to the drive shaft will be transmitted through one or the other of the cone gears to the driven shaft.

5. In gearing for indexing mechanisms, a drive shaft, means for imparting intermittent rotations to said shaft, a driven shaft for supporting the gear to be cut, a cone gear connected with said driven shaft, a second cone gear having its axis parallel with the said driven shaft and being supported in proximity to the first cone gear, a shaft having geared connections with the said cone gears whereby they will be driven together, a gear secured to the drive shaft, so as to turn therewith but be capable of longitudinal adjustment thereon, a lever pivoted on the drive shaft and connected with the latter gear, so that as the lever is shifted the gear will also be shifted upon the drive shaft, an idler pinion carried by the said lever between the said cone gears so that it may be thrown into driving relation with any part of either of said cone gears, a casing for the cone gears, and means on said lever for securing the same to the casing in any position to which it may be moved, whereby the intermittent rotation that is imparted to the drive shaft will be transmitted through one or the other of the cone gears to the driven shaft.

6. In gearing for indexing mechanisms, a shaft, means for imparting intermittent rotations to said shaft, a plurality of gears of different diameters secured to said shaft, a second shaft parallel with the first shaft, a plurality of gears of different diameters carried by said second shaft and meshing with the gears on the first shaft, means for securing at will any one of the gears on the said second shaft to that shaft and for simultaneously throwing or maintaining out of driving engagement with said shaft all of the other gears thereon, a driven shaft for supporting the gear blank to be cut, a cone gear connected with said driven shaft, a gear secured to said second shaft so as to turn therewith but be capable of longitudinal adjustment thereon, a lever pivoted to said second shaft and slidable thereon, said lever being connected with the last mentioned gear so that as the lever is shifted on the shaft the gear will be carried with it, an idler pinion journaled on said lever and meshing with the said shiftable gear on the second shaft, said idler pinion being adapted to be brought into mesh with any part of the said cone gear, and means for holding the lever in any position to which it may be moved.

7. In gearing for indexing mechanisms, a shaft, means for imparting intermittent rotations to said shaft, a plurality of gears of different diameters secured to said shaft, a second shaft parallel with the first shaft, a plurality of gears of different diameters carried by said second shaft and meshing with the gears on the first shaft, means for securing at will any one of the gears on the said second shaft to that shaft and for simultaneously throwing or maintaining out of driving engagement with said shaft all of the other gears thereon, a driven shaft supporting the gear blank to be cut, a cone gear connected with said driven shaft, a second cone gear having its axis parallel with the said driven shaft and being separated from the first cone gear, gearing connecting the cone gears a gear secured to said second shaft so as to turn therewith but be capable of longitudinal adjustment thereon, a lever pivoted to said second shaft and slidable thereon, said lever being connected with the last mentioned gear so that as the lever is shifted on the shaft the gear will be carried with it, an idler pinion journaled in said lever and meshing with the said shifting gear on the second shaft, said idler pinion being between the said cone gears and adapted to be brought into mesh with any part of either of the said cone gears, and means for holding the lever in any position to which it may be moved.

8. In gearing for indexing mechanisms, a shaft, means for imparting intermittent rotation to said shaft, a plurality of gears of different diameters secured to said shaft, a second shaft parallel with the first shaft, a plurality of gears of different diameters on said second shaft, a plurality of members in said second shaft, there being one member for each of the said gears thereon, said members being adapted to effect a driving relation between the shaft and said gears, springs tending to force said members into engagement with their respective gears so as to effect such relation, a rotatable rod in said second shaft, said rod having a plurality of sockets therein arranged in staggered fashion, the sockets being opposite said members, whereby, when said rod is turned to bring one of said sockets into operative relation with its respective member, said member will establish driving relation between the shaft and its gear, and the other sockets being out of operative relation with their respective members will hold the latter out of driving relation with their respective gears, means for turning said rod so as to drive any one of said gears with the said second shaft, a driven shaft carrying the gear blank to be cut, a cone gear connected with said driven shaft, a gear carried by said second shaft so as to turn therewith but be capable of longitudinal adjustment thereon, a lever pivoted to said second shaft and connected with said last mentioned gear so that, as said lever is moved, the gear will be correspondingly shifted, an idler pinion journaled in said lever, said pinion being adapted to be brought by said lever into driving relation with any part of the cone gear, and means for securing said lever in any position to which it may be moved.

9. In gearing for indexing mechanisms, a shaft, means for imparting intermittent rotation to said shaft, a plurality of gears of different diameters secured to said shaft, a second shaft parallel with the first shaft, a plurality of gears of different diameters on said second shaft, a plurality of members in said second shaft, there being one member for each of the said gears thereon, said members being adapted to effect a driving relation between the shaft and said gears, springs tending to force said members into engagement with their respective gears so as to effect such relation, a rotatable rod in said second shaft, said rod having a plurality of sockets therein arranged in staggered fashion, the sockets being opposite said members, whereby, when said rod is turned to bring one of said sockets into operative relation with its respective member, said member will establish driving relation between the shaft and its gear, and the other sockets, being out of operative relation with their respective members, will hold the latter out of driving relation with their respective gears, means for turning said rod so as to drive any one of said gears with the said second shaft, a driven shaft carrying the gear blank to be cut, a cone gear connected with said driven shaft, a second cone gear having its axis parallel with the said driven shaft and being separated from the first cone gear, connections between said cone gears a gear carried by said second shaft so as to turn therewith but be capable of longitudinal adjustment thereon, a lever pivoted to said second shaft and connected with said last mentioned gear so that, as said lever is moved, the gear will be correspondingly shifted, an idler pinion journaled in said lever, said pinion being in mesh with the shifting gear, said pinion also being between the said cone gears and adapted to be brought by said lever into driving relation with any part of either of the cone gears, and means for securing said lever in any position to which it may be moved.

10. In gearing for indexing mechanisms, a driven shaft adapted to support a gear blank, a second shaft a cone gear supported by said second shaft, a third shaft in proximity to the second shaft, connections between the driven and the second and third shafts, a cone gear supported by said third shaft, a fourth shaft having geared connection with both the aforesaid shafts, a drive shaft, and means for connecting said drive shaft with either of the cone gears and with any part of either of said cone gears.

11. In gearing for indexing mechanisms, a driven shaft adapted to support a gear blank, a second shaft a cone gear supported by said second shaft, a third shaft, a cone gear supported by said third shaft, bevel gears upon the ends of the second and third shafts, a fourth shaft having bevel gears at its ends meshing with the bevel gears upon the second and third shafts, connections between the cone gears and the driven shaft, a drive shaft, and means for connecting the drive shaft with either of the cone gears or with any part of either of the said cone gears.

12. In gearing for indexing mechanisms, a driven shaft adapted to support a gear blank, a second shaft, a cone gear supported by said second shaft, a third shaft in proximity thereto, a cone gear supported by said third shaft, a fourth shaft having geared connection with the second and third shafts whereby one is rotatably connected with the other, connections between the fourth shaft and the driven shaft, a drive shaft, a gear mounted upon said drive shaft, a lever, a gear carried by said lever in mesh with said gear upon the drive shaft, said lever being movable for causing the gear carried thereby to engage with any part of either of the cone gears.

13. In gearing for indexing mechanisms, a driven shaft adapted to support a gear blank, a second shaft, a cone supported by said second shaft and a third shaft, a cone supported by said third shaft, the said cones being reversely placed with respect to each other, gear wheels upon the ends of the second and third shafts, and means for connecting the said gear wheels, a fourth shaft connections for driving said shaft from either of the second or third shafts, a worm wheel mounted upon the driven shaft, a worm in mesh with said worm wheel, the said worm being driven by the fourth shaft, a drive shaft, and means for connecting the drive shaft with any part of either of the cone gears.

14. In gearing for indexing mechanisms, a shaft, a plurality of gears of different diameters rigidly mounted upon the said shaft, a second shaft, a plurality of gears of different diameters on the second shaft, plungers carried by the second shaft, the longest axis of the said plungers being arranged at different angles with respect to each other, said plungers being adapted to engage with their respective gears at different times, and means for causing a plunger to engage its gear while the other plungers are held from engagement with their gears.

15. In gearing for indexing mechanisms, a shaft, a plurality of gears of different diameters rigidly mounted upon said shaft, a second shaft, a plurality of gears of different diameters on the second shaft, a plurality of spring-pressed plungers carried by the second shaft, one plunger opposite each gear, and means for causing a plunger to engage its gear while the other plungers are held from engagement with their gears.

16. In gearing for indexing mechanisms, a shaft, a plurality of gears of different diameters rigidly mounted upon the said shaft, a second shaft, a plurality of gears of different diameters on the second shaft, plungers carried by the second shaft, one plunger opposite each gear, a rod extending into the second shaft and coöperating with the said plungers, said rod being provided with sockets, and means for turning said rod, whereby when the rod is turned, a single plunger will be engaged by said rod to permit its engagement with its gear wheel and lock the same to the shaft, while the other plungers are held from engagement with their gears.

In testimony whereof, I hereunto affix my signature in the presence of two witnesses.

EARL H. BROWNING.

Witnesses:
S. E. FOUTS,
BRENNAN B. WEST.